(12) United States Patent
Lanzarini et al.

(10) Patent No.: US 6,513,219 B1
(45) Date of Patent: *Feb. 4, 2003

(54) METHOD FOR PRODUCING A RING COLLAR, NOTABLY FOR A CLUTCH MECHANISM IN PARTICULAR FOR A MOTOR VEHICLE

(75) Inventors: Ernesto Lanzarini, Mondovì (IT); Mario Drago, Alba (IT)

(73) Assignee: Valeo, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/702,474

(22) PCT Filed: Dec. 22, 1995

(86) PCT No.: PCT/FR95/01726

§ 371 (c)(1),
(2), (4) Date: Nov. 4, 1996

(87) PCT Pub. No.: WO96/20052

PCT Pub. Date: Jul. 4, 1996

(30) Foreign Application Priority Data

Dec. 28, 1994 (FR) ............................................. 94 15760

(51) Int. Cl.[7] ................................................. B23P 17/00
(52) U.S. Cl. ......................................... 29/417; 228/155
(58) Field of Search ............................ 29/417, 898.067; 228/155, 170

(56) References Cited

U.S. PATENT DOCUMENTS

| | | | | |
|---|---|---|---|---|
| 1,650,852 A | * | 11/1927 | Rouanet | .................... 29/417 X |
| 2,728,976 A | * | 1/1956 | Kraus | ........................ 29/417 X |
| 2,948,322 A | | 8/1960 | Cox et al. | |
| 3,778,877 A | * | 12/1973 | Walker | ...................... 29/417 X |
| 4,320,565 A | * | 3/1982 | Warchol | ................ 29/898.067 |

FOREIGN PATENT DOCUMENTS

| | | |
|---|---|---|
| CA | 1078153 | 5/1980 |
| EP | 453167 | 10/1991 |

OTHER PUBLICATIONS

Patent Abstracts Of Japan vo. 10 No. 307 (M–527) Oct., 1986 JP,A, 61–119344 Jun. 1986.
Patent Abstracts of Japan vo. 8 No. 148 (M–308) Jul. 1984 JP,A, 59–045044 Mar. 1984.
Patent Abstracts of Japan vo. 10 No. 246 (M–510) Aug. 1986 JP,A, 61–076222 Apr. 1986.

* cited by examiner

*Primary Examiner*—David P. Bryant
(74) *Attorney, Agent, or Firm*—Liniak, Berenato & White

(57) ABSTRACT

A method for making a frustro-conical ring collar by providing a metal band, helically winding the band, cutting off a length of the band which corresponds to one lead of the helix, axially acting on the two ends of the band length to place them in facing positions, welding together the aligned ends to form a cylindrical ring, an conferring a frustro-conical shape to the ring.

4 Claims, 3 Drawing Sheets

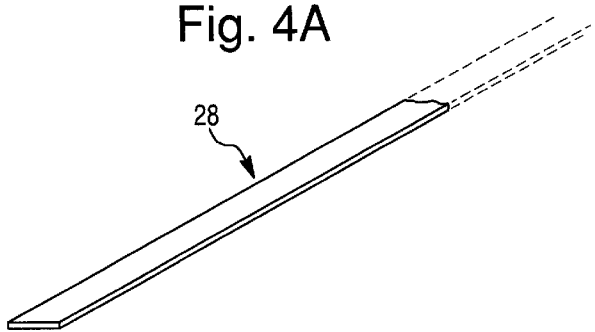
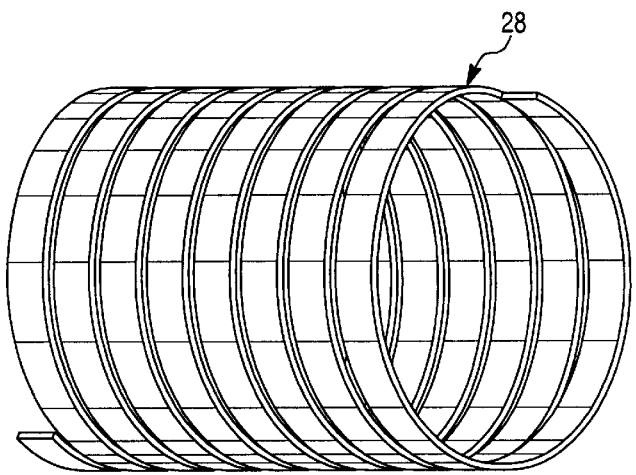
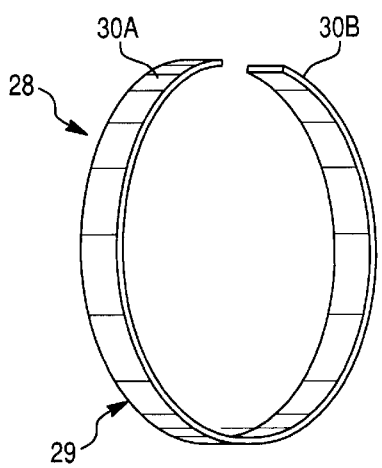
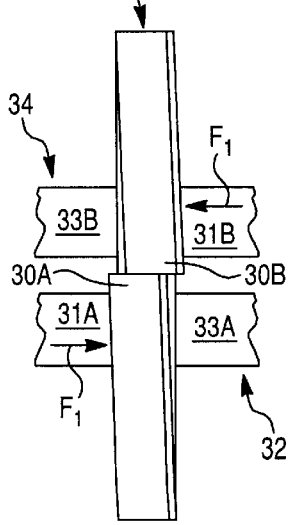
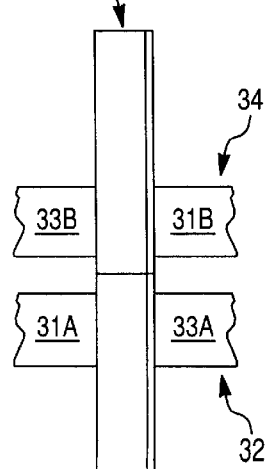
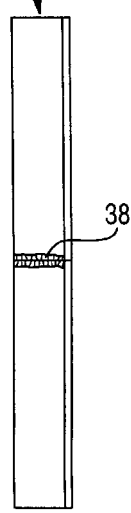

METHOD FOR PRODUCING A RING COLLAR, NOTABLY FOR A CLUTCH MECHANISM IN PARTICULAR FOR A MOTOR VEHICLE

BACKGROUND OF THE INVENTION

1. Field of the Invention

The invention concerns the production of ring collars of the type used in some diaphragm clutch mechanisms to provide an axial support to the diaphragm on the side opposite the axial support which is found at the bottom of the cover of such a mechanism.

These ring collars are in the shape of a truncated cone overall.

2. Description of the Prior Art

To produce ring collars it is possible, for example, to cut and stamp a metal blank.

But the corresponding production method leads, expensively, to large amounts of waste, notably on the inside of the ring collar obtained.

It is also possible to cut and stamp a tube.

But this production involves, in an equally expensive manner, the prior production of such a tube, and if this is a blind tube, there is still a considerable amount of waste at the corresponding end of the latter.

SUMMARY OF THE INVENTION

The object of the invention is a more economical production method.

Relating, therefore, to the production of a ring collar, this method is characterised in that, stating with a metal strip, this strip is wound helically, a length corresponding to one pitch of the helix is cut from this strip, the two ends of this length are acted upon axially in such a way that they are brought opposite one another, the two ends thus aligned are welded to one another so as to obtain a cylindrical ring, and this ring is formed into a truncated cone.

All these operation, which advantageously involve no waste, can advantageously be executed one after the other on the same machine.

The characteristics and advantages of the invention will moreover emerge from the description which follows, by way of example, with reference to the accompanying schematic drawings, in which.

Figure 2:
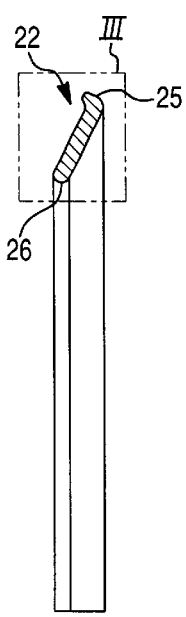
FIG. 2 is a partial view in axial section of this ring collar.
Figure 3:
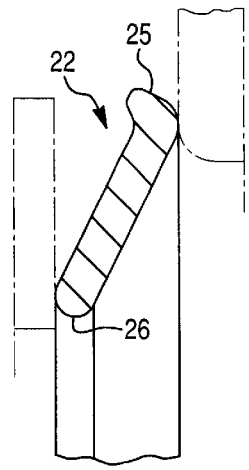
Figure 7:
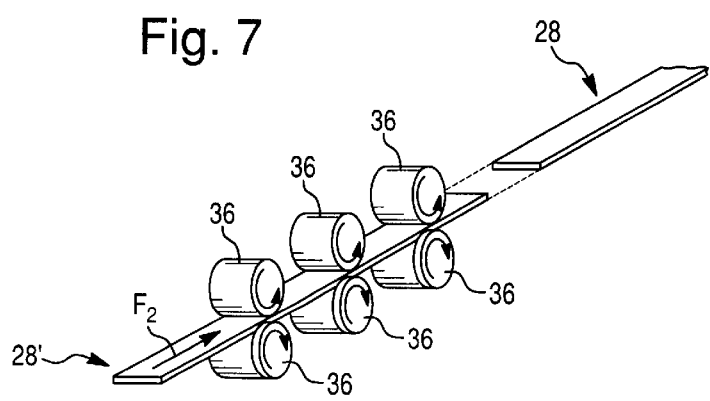
Figure 6A:
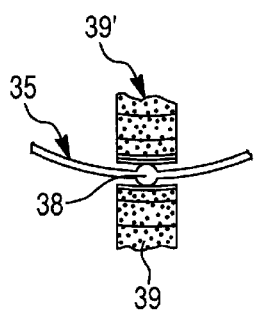
Figure 6B:
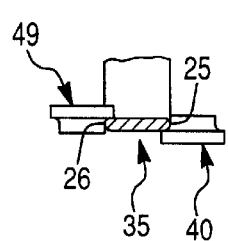
Figure 6C:
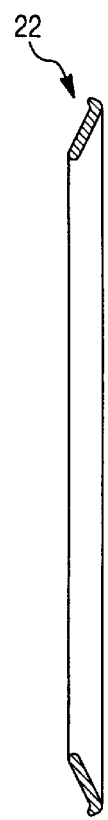

FIG. 3 repeats to a larger scale, the detail of FIG. 2 marked by an inset III on this FIG. 2;

FIGS. 4A, 4B, 4C are views in perspective illustrating three first phases of the production method according to the invention of this ring collar;

FIGS. 4D and 4E are plan views illustrating a subsequent phase of this method;

FIG. 5 is a plan view of the cylindrical ring obtained at this stage of this method;

FIG. 6A is a partial view of the end of this ring, illustrating an optional complementary phase of the method according to the invention;

FIG. 6B is a partial view in axial section of this ring, illustrating another optical complementary phase of the method according to the invention;

FIG. 6C is a view in axial section of the ring collar obtained at the end of the production method according to the invention;

FIG. 7 is a view in perspective illustrating an optional phase prior to the production method according to the invention.

DETAILED DESCRIPTION OF THE PREFERRED EMBODIMENT

Figure 1:
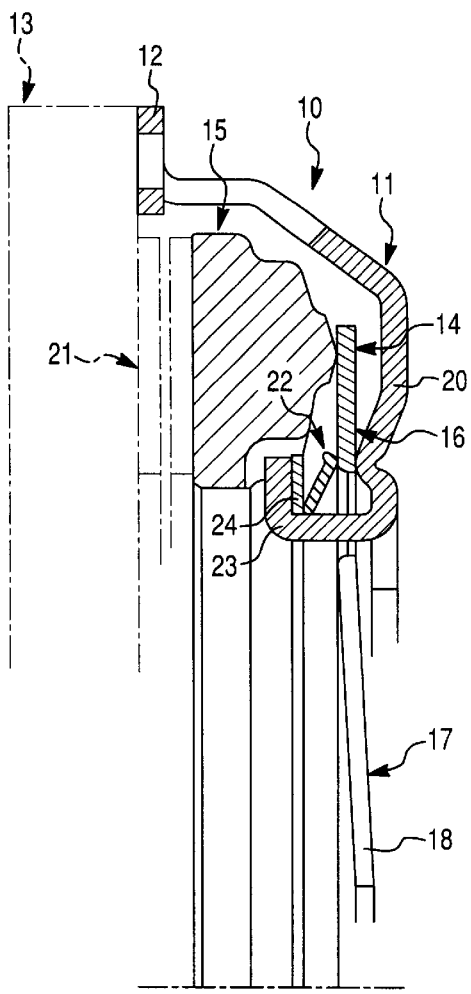
FIG. 1 is a partial view in axial section of a clutch mechanism using a ring collar.

FIG. 1 shows a clutch mechanism 10 having, in the form of overall annular parts, a cover 11, by means of a transverse rim 12 of which it is designed to be connected to a reaction plate 13, represented by broken lines in FIG. 1, a diaphragm 14 and a pressure plate 15.

The diaphragm 14 itself has a peripheral part 16, forming a Belleville washer, and a central part 17, divided into radial fingers 18 by slits.

By means of its peripheral part 16, the diaphragm 14 rests on the bottom 20 of the cover 11, and bears against the pressure plate 15, for forcing the latter in the direction of the reaction plate 13 and thus axially clamping a friction disc 21 inserted between this pressure plate 15 and this reaction plate 13, as shown schematically in broken lines in FIG. 1.

To provide axial support to the peripheral part 16 of the diaphragm 14 on the side opposite the bottom 20 of the cover 11, a ring collar 22 is provided which itself finds axial support on the elements 23 acting circularly from place to place and fixed to the cover 11.

Here these elements 23 are formed by lugs which, made in one piece with the bottom 20 of the cover 11, starting from the central aperture of the latter, are duly folded at right-angles and the ring collar 22 rests on theses elements 23 by means of a washer 24, which serves as a counter-tool when these elements 23 are folded and which prevents the ring collar 22 from being jammed in the folding bend of these elements.

The ring collar 22 is overall in the shape of a truncated cone.

By means of its larger-diameter periphery, it bears against the peripheral part 16 of the diaphragm 14.

Here the corresponding edge 25 is duly profiled accordingly, with a broad rounded part.

By means of its smaller-diameter periphery, the ring collar 22 rests on the washer 24.

Here its corresponding edge 26 is also duly profiled accordingly, with a broad rounded part.

The transverse section of the ring collar 22 therefore has, here, a specific profile.

This profile being well known, and not relating to the present invention, it will not be described in detail here.

For the production of the ring collar 22, which extends continuously in a circle, the following method according to the invention can be implemented.

Starting with a metal strip 28, FIG. 4A, this strip 28 is wound helically, FIG. 4B, and, first of all, a length 29 is cut from this strip 28 corresponding to one pitch of this helix, FIG. 4C.

Secondly, FIG. 4D, the two ends 30A, 30B of this length 29, offset axially in relation to one another, are acted upon axially so that they are brought exactly opposite one another, as depicted in FIG. 4E.

For example, as depicted schematically in FIGS. 4D and 4E, the two ends 30A, 30B of the length 29 are acted upon axially by means of the two movable arms 31A, 31B, of a clamp 32, in the direction of the arrows F1 in FIG. 4D, whilst buttressing this length 29, on the side diametrically opposite to these ends 30A, 30B, by means of the fixed arms 33A, 33B of another clamp 34.

The two thus aligned ends 30A, 30B of the length 29 are then welded to one another, so as to obtain a cylindrical ring 35 as depicted in FIG. 5.

Then it suffices to form this ring 35 into the shape of a truncated cone, for example by pressing. The required ring collar 22 is thus obtained as depicted in FIG. 6C.

According to a first possible embodiment of the invention, a strip 28 having in transverse section the profile desired for the transverse section of the ring collar 22 to be produced is chosen as the starting strip, as depicted in FIG. 4A.

In a variant, and as depicted in FIG. 7, a strip 28' of rectangular transverse section is chosen as the starting strip and, prior to its winding in a helix, this strip 28' is profiled according to the transverse section desired for the ring collar 22 to be produced.

For example, and as depicted in FIG. 7, this starting strip 28' is engaged, in the direction of the arrow F2, between two profiling rolls 36 acting simultaneously on both of its faces.

At the exit of these profiling rolls 36 there is thus obtained the strip 28 having in transverse section the profile desired for the transverse section of the ring collar 22 to be produced.

The ring 35 inevitably having, along its welding generatrix 38, a weld seam which projects both on its external surface and internal surface, this ring 35 is preferentially subjected, prior to its formation into a truncated cone shape, to deburring along this welding generatrix 38.

Here, FIG. 6A, this deburring is effected using two wheels 39, 391, one acting on the side of the external surface of the ring 35, the other on the side of its internal surface, and duly profiled accordingly.

Finally, prior to forming the ring 35 as a truncated cone, its edges 25, 26 are also preferentially deburred, FIG. 6B.

Here this deburring is effected using abrasive wheels, 40, 41, one acting on its edge 25, the other on its edge 26 and duly profiled accordingly.

Naturally, the present invention is not limited to the embodiment described and depicted but encompasses all variant embodiments.

What is claimed is:

1. A method for producing a ring collar in the shape of a truncated cone for a diaphragm clutch mechanism, said method comprising of the steps of:

profiling a rectangular transverse section of a strip (28, 28') to a desired transverse section of said ring collar;

helically winding said strip into a substantially tubular helix;

cutting a portion of said strip (28, 28') from said helix to a length corresponding to one pitch of said helix, positioning two ends (30A, 30B) of said strip opposite one another, welding said two ends to one another so as to obtain a cylindrical ring (35) having a welding generatrix (38), deburring said ring (35) along said welding generatrix, and forming said ring (35) into a truncated cone.

2. The method according to claim 1, wherein said method further comprises the step of deburring edges of said truncated cone prior to the formation of the ring (35).

3. The method according to claim 1, wherein said steps further comprise:

pressing said ring (35) into said truncated cone shape.

4. A method for producing a ring collar in the shape of a truncated cone for a diaphragm clutch mechanism, said method comprising of the steps of:

helically winding said strip into a substantially tubular helix, having in transverse section a profile desired for a transverse section of the ring collar (22);

cutting a portion of said strip (28, 28') from said helix to a length corresponding to one pitch of said helix, positioning two ends (30A, 30B) of said strip opposite one another, welding said two ends to one another so as to obtain a cylindrical ring (35) having a welding generatrix (38), deburring said ring (35) along said welding generatrix (38); and forming said ring (35) into a truncated cone.

* * * * *